US011107434B2

(12) United States Patent
Kim et al.

(10) Patent No.: US 11,107,434 B2
(45) Date of Patent: Aug. 31, 2021

(54) GAMMA ADJUSTMENT CIRCUIT AND DISPLAY DRIVER CIRCUIT USING THE SAME

(71) Applicant: Samsung Electronics Co., Ltd., Suwon-si (KR)

(72) Inventors: In-Suk Kim, Suwon-si (KR); Chan Bong Yu, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/036,627

(22) Filed: Sep. 29, 2020

(65) Prior Publication Data

US 2021/0027736 A1 Jan. 28, 2021

Related U.S. Application Data

(63) Continuation of application No. 16/207,336, filed on Dec. 3, 2018, now abandoned.

(30) Foreign Application Priority Data

Mar. 21, 2018 (KR) ........................ 10-2018-0032608

(51) Int. Cl.
*G06F 1/00* (2006.01)
*G09G 3/36* (2006.01)

(52) U.S. Cl.
CPC ......... *G09G 3/3688* (2013.01); *G09G 3/3648* (2013.01); *G09G 3/3696* (2013.01); *G09G 2310/027* (2013.01); *G09G 2320/0276* (2013.01); *G09G 2320/0673* (2013.01)

(58) Field of Classification Search
None
See application file for complete search history.

(56) References Cited

U.S. PATENT DOCUMENTS 7,446,747 B2 11/2008 Youngblood et al.
8,154,478 B2 4/2012 Park et al.
8,698,720 B2 4/2014 Kaneda et al.
8,730,223 B2 5/2014 Kim et al.
2006/0022925 A1* 2/2006 Hara .................... G09G 3/3688 345/89

(Continued)

FOREIGN PATENT DOCUMENTS

JP 2009-008958 A 1/2009

*Primary Examiner* — Michael A Faragalla
(74) *Attorney, Agent, or Firm* — Harness, Dickey & Pierce, P.L.C.

(57) ABSTRACT

A gamma adjustment circuit includes: a first node; a second node; a first decoder to which a first voltage signal and a second voltage signal are provided and which outputs either one of the first voltage signal and the second voltage signal as a third voltage signal; an amplifier receiving the third voltage signal as a positive input and outputting a fourth voltage signal; a second decoder receiving the fourth voltage signal and outputting the provided fourth voltage signal as a fifth voltage signal to one of the first and second nodes; a third decoder connected to the first and second nodes, receives the fifth voltage signal from one of the first and second nodes, and outputs the fifth voltage signal to a negative input terminal of the amplifier as a sixth voltage signal; and a first resistor connected between the first node and the second node.

20 Claims, 15 Drawing Sheets

(56) References Cited

U.S. PATENT DOCUMENTS

| | | | | |
|---|---|---|---|---|
| 2006/0279498 | A1* | 12/2006 | Kaneda ................ | G09G 3/3696 345/89 |
| 2016/0079931 | A1 | 3/2016 | Tsai et al. | |
| 2017/0053581 | A1 | 2/2017 | Jung et al. | |
| 2017/0092181 | A1 | 3/2017 | Nishimura et al. | |

* cited by examiner

GAMMA ADJUSTMENT CIRCUIT AND DISPLAY DRIVER CIRCUIT USING THE SAME

This application is a continuation application of U.S. application Ser. No. 16/207,336, field on Dec. 3, 2018, which claims priority to Korean Patent Application No. 10-2018-0032608, filed on Mar. 21, 2018, and all the benefits accruing therefrom under 35 U.S.C. § 119, the disclosure of each of which is incorporated herein by reference in its entirety.

BACKGROUND

1. Field

Example embodiments of the present inventive concepts relate to a gamma adjustment circuit and/or a display driver circuit using the same. For example, at least some example embodiments of the present inventive concepts relate to a gamma adjustment circuit in which an integration degree is improved and a gamma adjustment range is expanded, and/or a display driver circuit using the same.

2. Description of the Related Art

In the field of display, requirements for image quality are increasingly emphasized. In particular, success or failure of matching between a gamma curve and the characteristics of the display panel is important.

If the gamma curve is designed in accordance with the characteristics of a specific display panel, there may be a case where the luminance characteristics may not be satisfied when the characteristics of the display panel change. Therefore, in order to satisfy the luminance characteristics of the changed display panel, the hardware associated with the gamma curve (e.g., a display driver) may also be changed.

Also, in an attempt to further reduce the size of the display driver integrated circuit, for example, there is a trend towards reducing the bezel thickness of the display panel.

SUMMARY

Some example embodiments of the present inventive concepts provide a gamma adjustment circuit with an increased degree of integration, and/or a display driver circuit using the same.

Some other example embodiments of the present inventive concepts provide a gamma adjustment circuit in which the adjustment range of the gamma curve is expanded, and/or a display driver circuit using the same.

According to some example embodiments of the present inventive concepts, a gamma adjustment circuit includes a first decoder configured to receive a first voltage signal and a second voltage signal, and output one of the first voltage signal and the second voltage signal as a third voltage signal; an amplifier including a positive input and a negative input, the positive input configured to receive the third voltage signal, and to output a fourth voltage signal; a second decoder configured to output the fourth voltage signal to one of a first node and a second node as a fifth voltage signal; a third decoder connected to the first node and the second node, the third decoder configured to output the fifth voltage signal to the negative input of the amplifier as a sixth voltage signal; and a first resistor connected between the first node and the second node.

According to some example embodiments of the present inventive concepts, a display driver circuit includes a source driver integrated circuit (IC) configured to transmit an analog voltage to a display panel; a gate driver integrated circuit (IC) configured to control a gate of the display panel so that the analog voltage is provided to a storage device associated with the display panel; a controller configured to control the source driver IC and the gate driver IC based on a signal received from a host; and a gamma adjustment circuit configured to transmit the analog voltage to the source driver IC, the gamma adjustment circuit including, an amplifier including a cascade differential amplifier and a common source (CS) amplifier, the cascade differential amplifier configured to receive a first signal, and to generate a second signal based on the first signal, the CS amplifier configured to receive the second signal, and to generate a third signal based on the second signal, a first decoder including a first output terminal and a second output terminal, the first decoder configured to receive the third signal from the CS amplifier, the first decoder configured to select, based on a first selection signal, one of the first output terminal and the second output terminal as a selected output terminal, to provide the third signal to the selected output terminal as a fourth signal, and a second decoder including a first input terminal and a second input terminal.

According to some example embodiments of the present inventive concepts, a display driver circuit includes a source driver integrated circuit (IC) configured to transmit an analog voltage to a display panel; a gate driver integrated circuit (IC) configured to control a gate of the display panel so that the analog voltage is provided to a storage device associated with the display panel; a controller configured to control the source driver IC and the gate driver IC based on a signal received from a host; and a gamma adjustment circuit configured to transmit the analog voltage to the source driver IC, the gamma adjustment circuit including, a first decoder including an input terminal and an output terminal, a second decoder including an input terminal and an output terminal, the input terminal of the second decoder being connected, via at least a first node and a second node, to the output terminal of the first decoder, the first node and the second node having a first resistor connected therebetween, and an amplifier including a negative input terminal, a positive input terminal and an output terminal, the negative input terminal of the amplifier being connected to the output terminal of the second decoder, and the output terminal of the amplifier being connected to the input terminal of the first decoder.

Example embodiments of the present inventive concepts are not limited to those mentioned above and another aspect which is not mentioned may be clearly understood by those skilled in the art from the description below.

DETAILED DESCRIPTION

Figure 1:
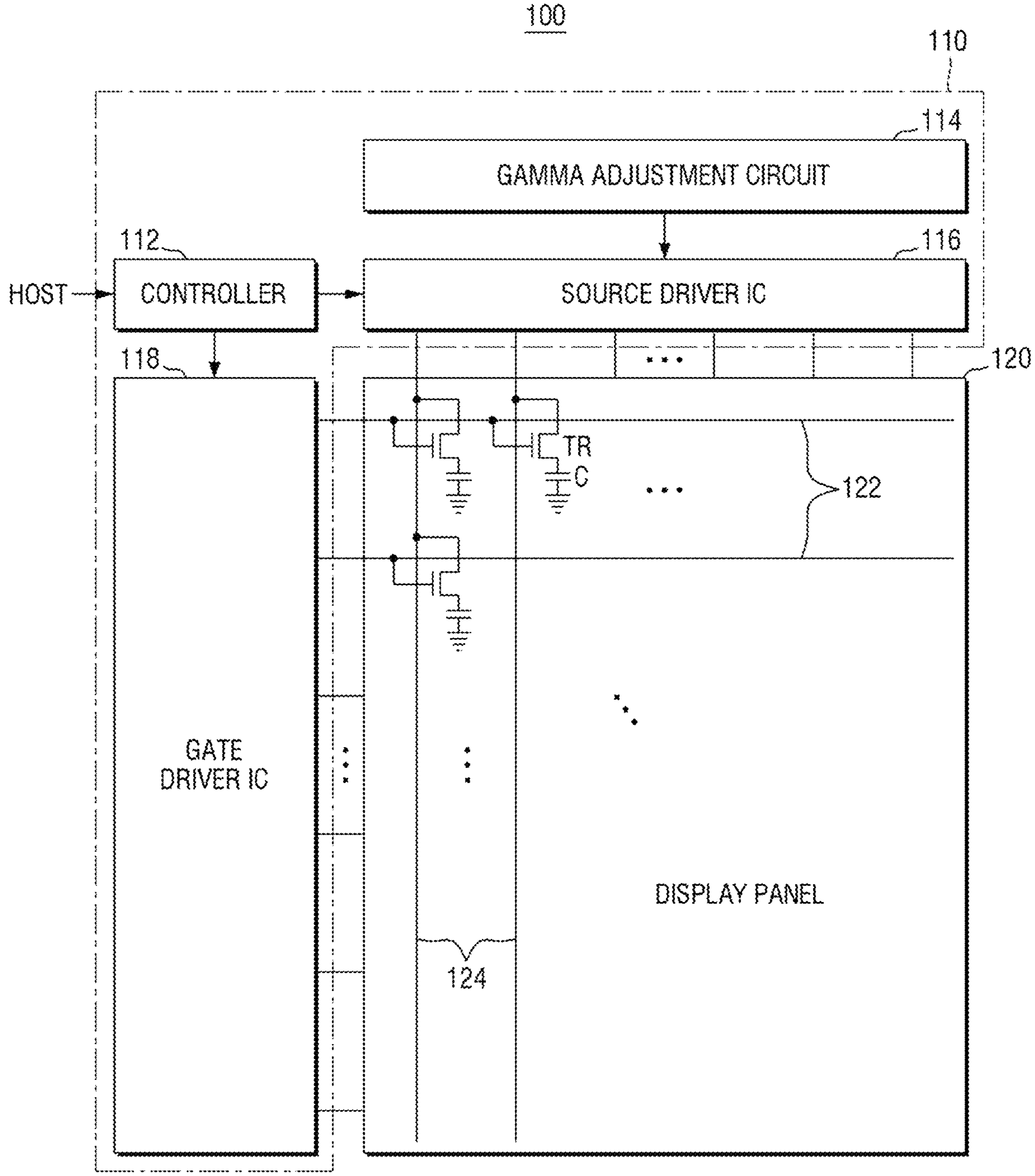
FIG. 1 is an example block diagram for explaining the structure of a display device according to some example embodiments.

FIG. 1 is an example block diagram for explaining the structure of a display device according to some example embodiments.

Referring to FIG. 1, a display device 100 may include a display driver circuit 110 and a display panel 120.

According to some example embodiments, the display driving circuit 110 may include a controller 112, a gamma adjustment circuit 114, a source driver integrated circuit 116 (source driver IC), and a gate driver integrated circuit 118 (gate driver IC).

The controller 112 may receive a signal from the host (HOST). The controller 112 may control the source driver integrated circuit 116 and the gate driver integrated circuit 118, on the basis of the received signal. In some example embodiments, the controller 112 may receive a clock signal from the host (HOST). The controller 112 may control the turning on/off of the gate connected to the gate driver integrated circuit 118 on the basis of the clock signal.

In some example embodiments, the controller 112 may receive the digital data from the host (HOST). The controller 112 may provide the received digital data to the source driver integrated circuit 116. In some example embodiments, the host (HOST) may be an application processor (AP), but example embodiments are not limited thereto.

In some example embodiments, the display panel 120 may include a row line 122 and a column line 124. The display panel 120 may include a plurality of transistors TR arranged along the row line 122. The plurality of transistors TR arranged along the row line 122 may be gated to the same row line 122.

In some example embodiments, the gate driver integrated circuit 118 may be connected to the row line 122 of the display panel 120. The gate driver integrated circuit 118 may provide a gating signal to the row line 122 of the display panel 120. When the gating signal is provided to the row line 122, the plurality of transistors TR arranged along the row line 122 to which the gating signal is provided may be turned on.

In some example embodiments, the display panel 120 may include t plurality of transistors TR arranged along the column line 124. The source/drain of the plurality of transistors TR arranged along the column line 124 may be connected to the same column line 124.

In some example embodiments, the source driver integrated circuit 116 may be connected to a column line 124 of the display panel 120. The source driver integrated circuit 116 may provide an analog voltage to the column line 124 of the display panel 120. In some example embodiments, the controller 122 may receive digital data from the host (HOST). The controller 122 may provide the received digital data to the source driver integrated circuit 116. The source driver integrated circuit 116 may convert the provided digital data to an analog voltage, using the gamma adjustment circuit 114. The source driver integrated circuit 116 may provide the converted analog voltage to the column line 124 of the display panel 120. In other words, the source driver integrated circuit 116 may provide the analog voltage corresponding to the digital data received from the controller 112 to the display panel 120.

In some example embodiments, the source driver integrated circuit 116 may provide the analog voltage to the column line 124 of the display panel 120, and the gate driver integrated circuit 118 may provide the gating signal to the row line 122 of the display panel 120. By the gating signal provided to the row line 122, the plurality of transistors TR arranged along the row line 122 may be turned on. Since the plurality of transistors TR arranged along the row line 122 is turned on, each of the column lines 124 may be connected to the capacitor C. In other words, each of the analog voltages provided to the column line 124 may be provided to the capacitor C connected to the plurality of transistors TR arranged along the row line 122. The capacitor C may store the analog voltage. The analog voltage stored in the capacitor C may correspond to the brightness of the pixel of the display panel 120.

In some example embodiments, one transistor TR and one capacitor C may be defined as pixels, but the example embodiments are not limited thereto. For example, one pixel may include three transistors TR and three capacitors C. Although FIG. 2 illustrates the transistor TR as an NMOSFET, the example embodiments are not limited thereto.

The gamma adjustment circuit 114 according to some example embodiments will be described referring to FIGS. 2 and 3.

Figure 2:
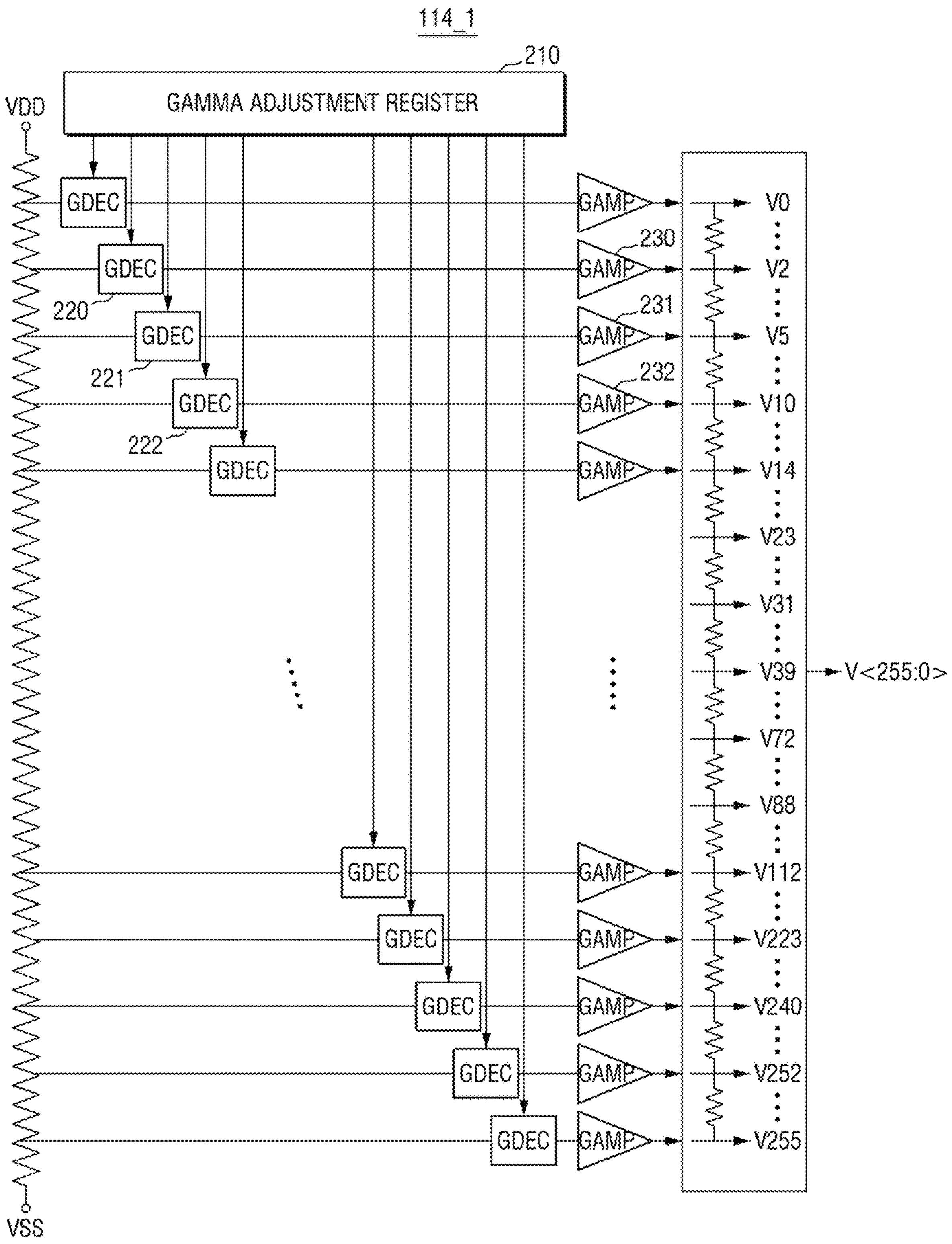
FIG. 2 is an example diagram for illustrating the gamma adjustment circuit according to some example embodiments.

FIG. 2 is an example diagram for illustrating the gamma adjustment circuit according to some example embodiments. FIG. 3 is an example diagram for illustrating the gamma adjustment circuit according to some example embodiments in detail.

Referring to FIG. 2, a gamma adjustment circuit 114_1 according to some example embodiments may include a gamma adjustment register 210, a plurality of gamma decoders 220 to 222 (GDEC), and a plurality of gamma amplifiers 230 to 232 (GAMP).

As described above, in some example embodiments, the source driver integrated circuit 116 may convert the digital data into the analog voltage, using the gamma adjustment circuit 114_1. In some example embodiments, the digital data may be 8 bit data. In other words, the digital data may be a total of 256 digital data from [00000000] to [11111111]. In some example embodiments, the analog voltages V0 to V255 may be voltage values corresponding to 256 digital data, respectively. For example, the analog voltage V0 may be the voltage value corresponding to the digital data [00000000]. In some example embodiments, the analog voltages V0 to V255 are mixed with the 0th to 255th output voltages V0 to V255.

In some example embodiments, each of the analog voltages V0 to V255 may refer to the brightness of the pixels included in the display panel 120. For example, the controller 112 may receive the digital data of the first pixel from the host (HOST). The digital data of the first pixel may refer to the degree of brightness to be displayed by the first pixel. The controller 112 may provide the digital data of the first pixel to the source driver integrated circuit 116. When the digital data of the first pixel provided from the controller 112 is [00000001], the source driver integrated circuit 116 may convert [00000001] into the first output voltage V1, using the gamma adjustment circuit 114. Subsequently, the source driver integrated circuit 116 may provide the first output voltage V1 to the first pixel.

In some example embodiments, even if the digital data linearly changes from [00000000] to [11111111], the analog voltages V0 to V255 corresponding to each digital data may change nonlinearly. This is because the degree in which the human vision perceives a change in brightness is nonlinear, it may be to correct the degree. The gamma adjustment circuit 114_1 will be described in more detail referring to FIG. 3.

Figure 3:
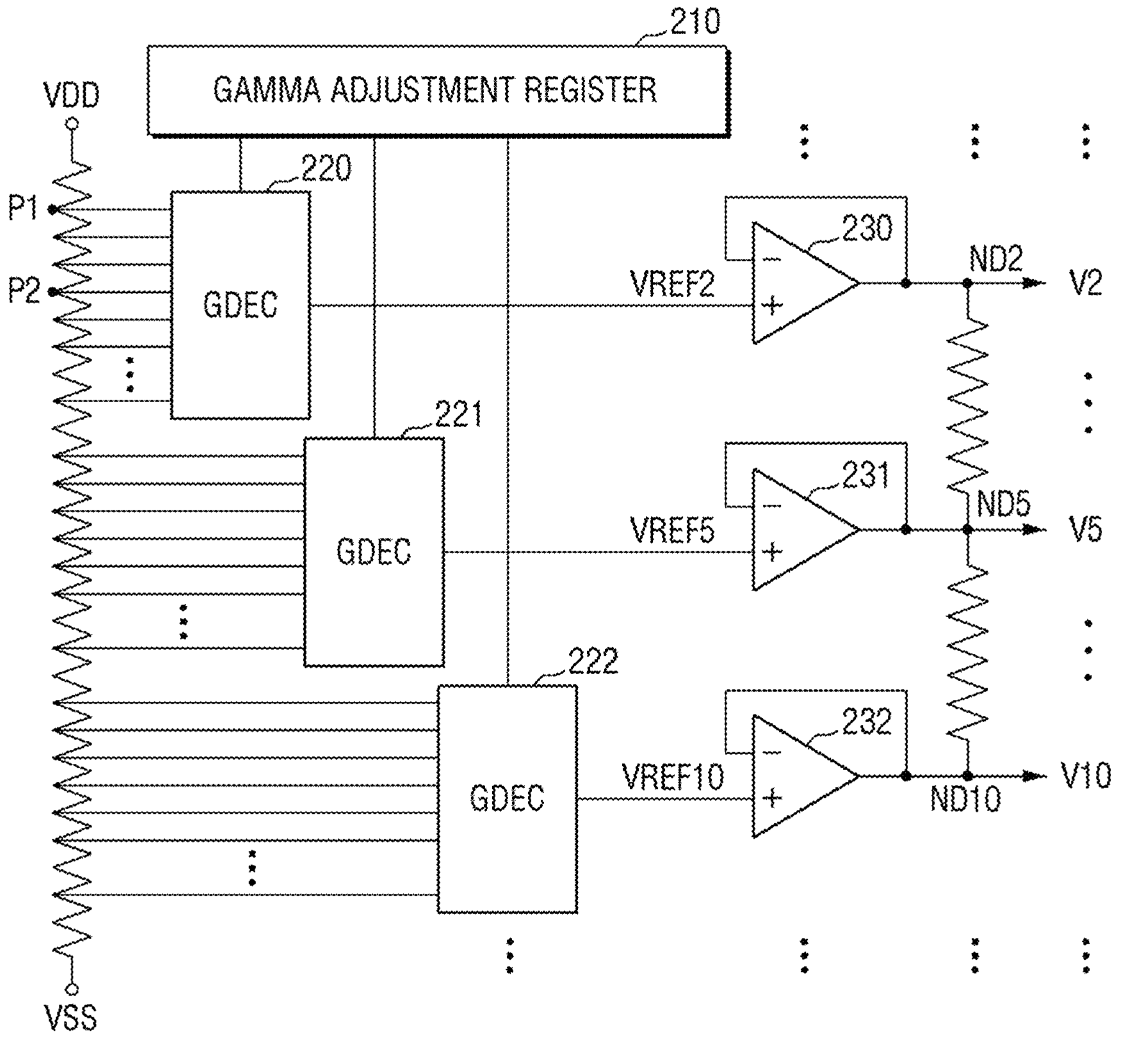
FIG. 3 is an example diagram for illustrating the gamma adjustment circuit according to some example embodiments in detail.

Referring to FIG. 3, FIG. 3 illustrates only a part of the gamma adjustment circuit 144_1 for convenience of explanation.

In some example embodiments, the gamma adjustment register 210 may be connected to each of the plurality of gamma decoders 220 to 222. The first gamma decoder 220 may determine a second reference voltage VREF2 to be provided to the first gamma amplifier 230. In some example embodiments, the first gamma decoder 220 may determine a second reference voltage VREF2 to be provided to the first gamma amplifier 230 on the basis of the value stored in the gamma adjustment register 210. For example, when the value stored in the gamma adjustment register 210 is a first value, the first gamma decoder 220 may determine the voltage applied to a first point P1 as a second reference voltage VREF2. When the value stored in the gamma adjustment register 210 is the second value different from the first value, the first gamma decoder 220 may determine the voltage applied to a second point P2 as the second reference voltage VREF2. In a similar manner, the second and third gamma decoders 221 and 222 may determine fifth and tenth reference voltages VREF5 and VREF10 to be provided to the second and third gamma amplifiers 231 and 232.

In some example embodiments, the first to third gamma amplifiers 230 to 232 may provide the output to a second output node ND2, a fifth output node ND5 and a tenth output node ND10, respectively. In some example embodiments, the first to third gamma amplifiers 230 to 232 may operate as buffers. In other words, the outputs provided to the second, fifth, and tenth output nodes ND2, ND5, and ND10 may be substantially the same as the second, fifth, and tenth reference voltages VREF2, VREF5, and VREF10. In this specification, the expression that voltages are substantially the same means that the voltage levels are the same when assuming that there is no voltage drop generated when passing through a conductor and an element. Those having ordinary skill in the technical field of the present inventive concepts may sufficiently understand expressions that the voltages are substantially the same.

In some example embodiments, since the first to third gamma amplifiers 230 to 232 operate as buffers, the second, fifth, and fifth reference voltages VREF2, VREF5, and VREF10 determined by the first to third gamma decoders 220 to 222 may be the second, fifth, and tenth output voltages V2, V5, and V10, respectively. In some example embodiments, the second, fifth, and tenth output voltages V2, V5, and V10 may be the analog voltages corresponding to digital data 2, 5, 10 (i.e., [00000010], [00000101], and [00001010]), respectively. That is to say, each of the plurality of gamma decoders may determine the magnitude of a plurality of output voltages (V0, V2, V5, V1, . . . , V255 of FIG. 2).

For example, a method for determining the output voltage of an output node to which a gamma amplifier is not connected, such as the sixth output node ND6 will be described with reference to FIG. 4.

Figure 4:
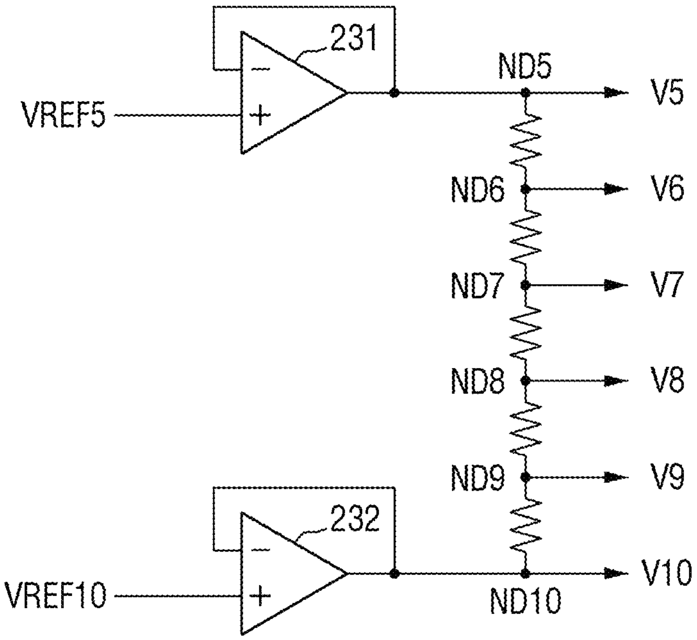
FIG. 4 is an example diagram illustrating a method for determining the output voltage of some output nodes according to some example embodiments.

FIG. 4 is an example diagram illustrating a method for determining the output voltage of some output nodes according to some example embodiments.

FIG. 4 illustrates a part of FIGS. 2 and 3. In some example embodiments, an output terminal of the second gamma amplifier 231 may be connected to the fifth output node ND5. Since the second gamma amplifier 231 operates as a buffer, a fifth reference voltage VREF5 may be provided to the fifth output node ND5. In other words, the analog voltage V5 corresponding to the digital data [00000101] may be the fifth reference voltage VREF5.

In some example embodiments, the output terminal of the third gamma amplifier 232 may be connected to the tenth output node ND10. Since the third gamma amplifier 232 operates as a buffer, a tenth reference voltage VREF10 may be provided to the tenth output node ND10. In other words, the analog voltage V10 corresponding to the digital data [00001010] may be the tenth reference voltage VREF10.

In some example embodiments, a resistor may be connected between the fifth output node ND5 and the tenth output node ND10. Since the fifth output voltage V5 and the tenth output voltage V10 are different from each other, a voltage drop may occur in the resistor between the fifth output node ND5 and the tenth output node ND10. That is, a voltage drop may occur from the fifth output node ND5 to the tenth output node ND10.

In some example embodiments, the sixth to ninth output nodes ND6 to ND9 may be disposed at equal intervals between the fifth output node ND5 and the tenth output node ND10. The sixth to ninth output voltages V6 to V9 may be the voltages at the sixth to ninth output nodes ND6 to ND9, respectively. In other words, the sixth to ninth output voltages V6 to V9 may have voltage values linearly decreasing or increasing between the fifth output voltage V5 and the tenth output voltage V10. The example description will be made referring to FIGS. 5 and 6.

Figure 5:
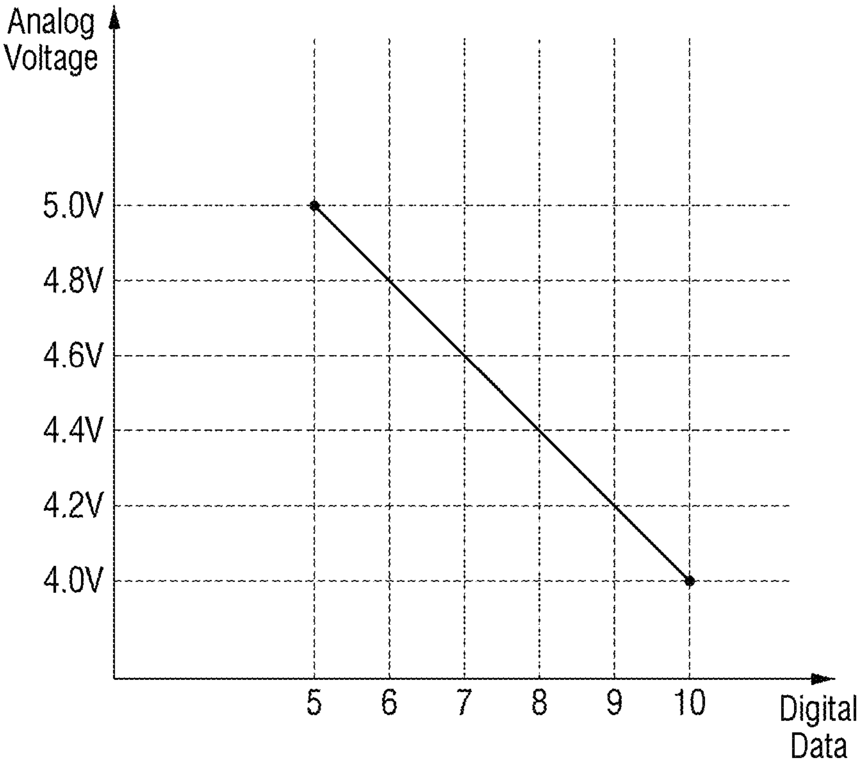
FIGS. 5 and 6 are example graphs for illustrating the sixth to ninth output voltages of the gamma adjustment circuit according to some example embodiments.
Figure 6:
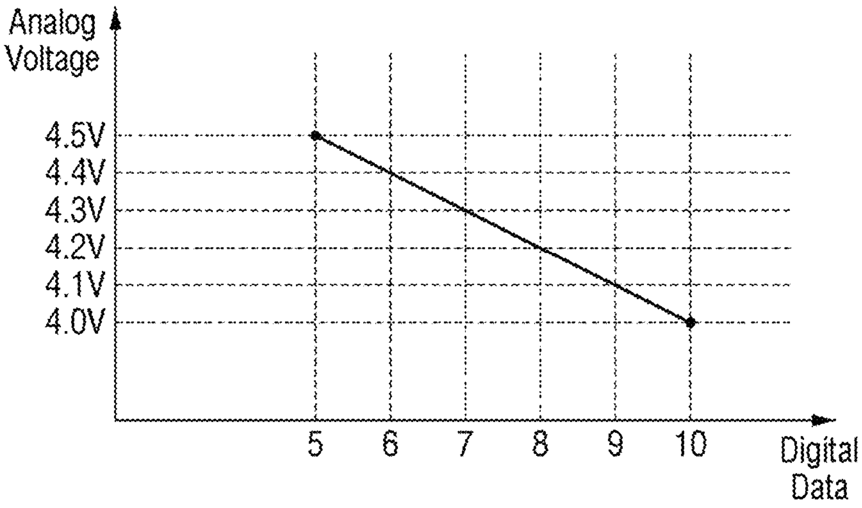

FIGS. 5 and 6 are example graphs for illustrating the sixth to ninth output voltages of the gamma adjustment circuit according to some example embodiments.

Referring to FIG. 5, a case where the analog voltage V5 corresponding to the digital data 5 (that is, [00000101]) is 5.0V and the analog voltage V10 corresponding to the digital data 10 (that is, [00001010]) is 4.0V is assumed. In other words, a case where the fifth reference voltage VREF5 determined by the second gamma decoder 221 is 5.0V and the tenth reference voltage VREF10 determined by the third gamma decoder 222 is 4.0V will be explained as an example. However, these voltage values are illustrative, and the example embodiments are not limited thereto.

In some example embodiments, the fifth output voltage V5 may decrease linearly until it reaches the tenth output voltage V10. In other words, the sixth to ninth output voltages V6 to V9 may be values that decrease with the same slope between the fifth output voltage V5 and the tenth output voltage V10. In other words, the sixth to ninth output voltages V6 to V9 may be 4.8V, 4.6, 4.4V, and 4.2V, respectively.

Referring to FIG. 6, a case where the analog voltage V5 corresponding to the digital data 5 (i.e., [00000101]) is 4.5 V and the analog voltage V10 corresponding to the digital data 10 (i.e., [00001010]) is 4.0 V is assumed. In other words, a case where the fifth reference voltage VREF5 determined by the second gamma decoder 221 is 4.5V and the tenth reference voltage VREF 10 determined by the third gamma decoder 222 is 4.0V will be explained as an example. However, these voltage values are illustrative, and the example embodiments are not limited thereto.

In some example embodiments, the fifth output voltage V5 may decrease linearly until it reaches the tenth output voltage V10. In other words, the sixth to ninth output voltages V6 to V9 may be values that decrease with the same slope between the fifth output voltage V5 and the tenth output voltage V10. In other words, the sixth to ninth output voltages V6 to V9 may be 4.4V, 4.3V, 4.2V, and 4.1V, respectively.

FIGS. 5 and 6 illustrate only the specific sections, and the digital data and analog voltage are linearly illustrated. However, in the entire section, the digital data and the analog voltage have a nonlinear relationship. This will be described with reference to FIG. 7.

Figure 7:
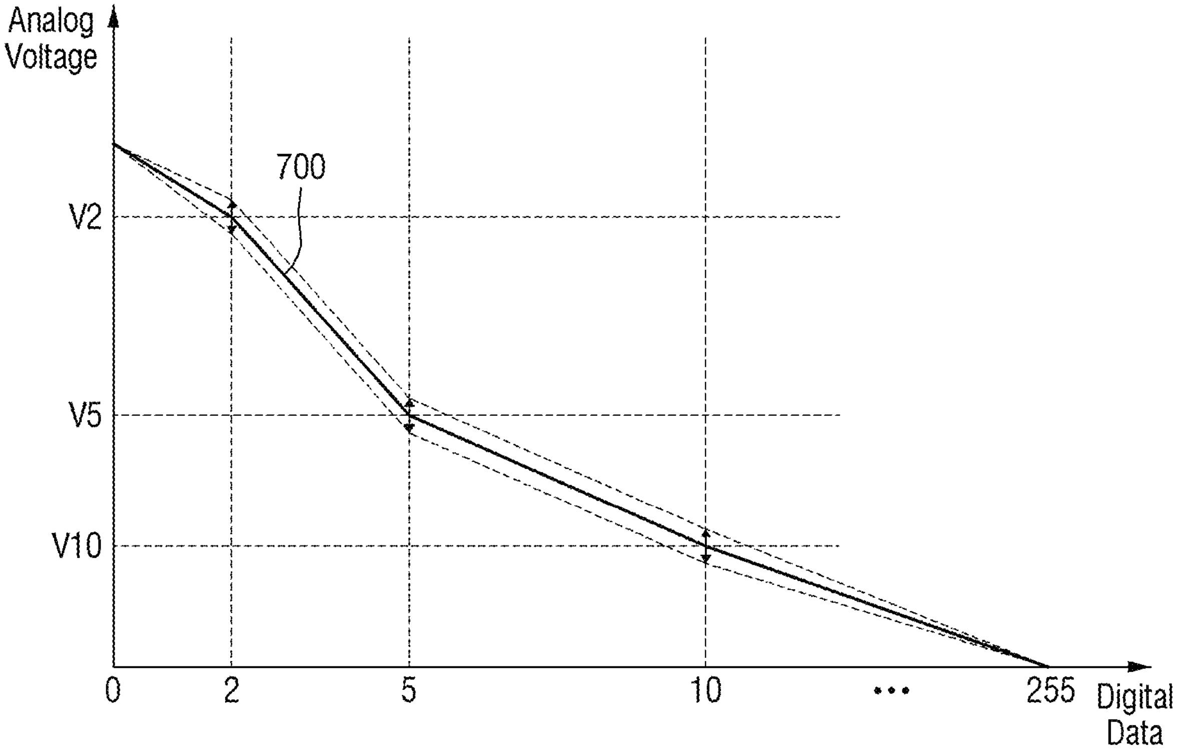
FIG. 7 is an example graph illustrating the adjustment range of magnitude of the analog voltage of the gamma adjustment circuit according to some example embodiments.

FIG. 7 is an example graph illustrating the adjustment range of magnitude of the analog voltage of the gamma adjustment circuit according to some example embodiments.

FIG. 7 illustrates that only the digital data 2, 5, and 10 may adjust the magnitude of the corresponding analog voltage, but this is for convenience of explanation, and the example embodiments are limited thereto.

In some example embodiments, for convenience of explanation, digital data that may variously adjust the magnitude of the corresponding analog voltage may be defined as a first digital data (e.g., 2, 5, and 10), and the digital data in which the magnitude of the corresponding analog voltage depends on the adjacent analog voltage values may be defined as second digital data (e.g., 6 to 9). For convenience of explanation, a graph illustrating the digital data and the magnitude of the analog voltage corresponding thereto is referred to as a gamma curve. That is, a solid line illustrated in FIG. 7 may be a gamma curve 700. Further, a dotted line illustrated in FIG. 7 may be a range in which the gamma curve 700 may be changed.

Referring to FIG. 7, the magnitude of the analog voltage corresponding to the first digital data may be adjusted by the gamma decoder. For example, the magnitudes of the analog voltages corresponding to the digital data 2, 5, and 10 may be increased or decreased by the gamma decoders 220 to 222.

On the other hand, the magnitude of the analog voltage corresponding to the second digital data may depend on the magnitude of the analog voltage corresponding to the first digital data. For example, the magnitude of the analog voltage corresponding to the digital data 6 to 9 may change, depending on the magnitude of the analog voltage corresponding to the digital data 5 and the magnitude of the analog voltage corresponding to the digital data 10. As described above, the magnitude of the analog voltage corresponding to the second digital data may linearly increase or decrease between the magnitudes of the analog voltages corresponding to the first digital data.

Referring to FIGS. 5 to 7, in some example embodiments, the magnitude of the analog voltage (e.g., V5) corresponding to the first digital data may be determined by the gamma decoder. The analog voltage (e.g., V6) corresponding to the second digital data may depend on the magnitude of the analog voltage (e.g., V5, and V10) corresponding to the first digital data. Determination of the first digital data and the second digital data in the gamma adjustment circuit 114_1 according to some example embodiments is performed in advance at a stage in which the gamma adjustment circuit 114_1 is manufactured. In other words, the output node to which the output of the gamma amplifier is connected is determined at the stage in which the gamma adjustment circuit 114_1 is manufactured. For example, the connection of the output of the first gamma amplifier 230 to the second output node ND2 is determined at the state in which the gamma adjustment circuit 114_1 is manufactured. In order to connect the output of the first gamma amplifier 230, for example, to the third output node ND3, hardware (e.g., the display driver) may need to be changed.

Figure 8:
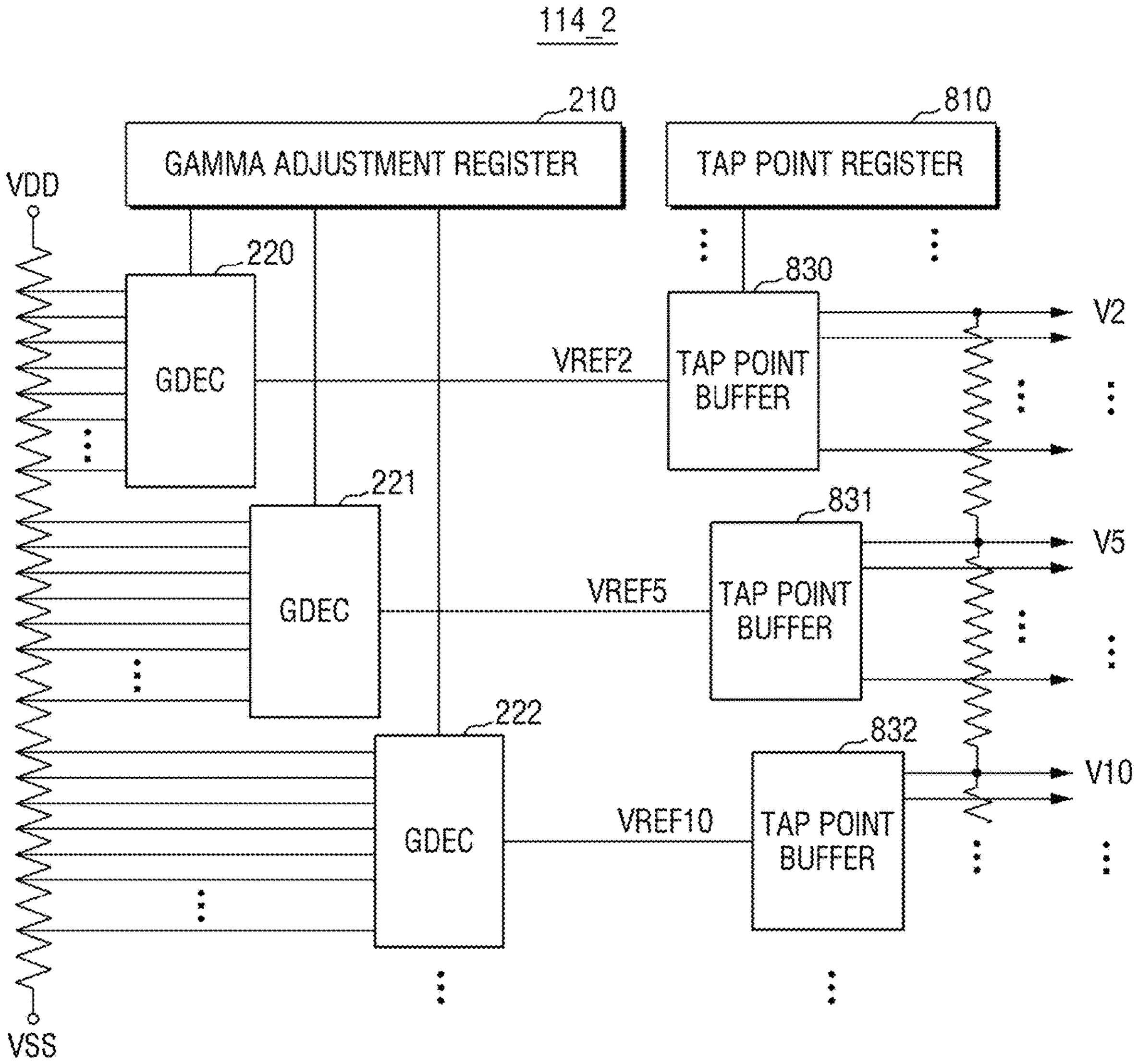
FIG. 8 is an example diagram for describing the gamma adjustment circuit according to some example embodiments.

FIG. 8 is an example diagram for describing the gamma adjustment circuit according to some example embodiments. For convenience of explanation, repeated contents will be omitted or briefly explained. FIG. 8 illustrates a part of the gamma adjustment circuit 114.

Referring to FIG. 8, the gamma adjustment circuit 114_2 according to some example embodiments may include a gamma adjustment register 210, a plurality of gamma decoders 220 to 222, a tap point register 810, and a plurality of tap point buffers 830 to 832.

As described above, the gamma adjustment register 210 may be connected to each of the first to third gamma decoders 220 to 222. The outputs of each of the first to third gamma decoders 220 to 222 may be connected to the first to third tap point buffers 830 to 832, respectively. In other words, the first to third tap point buffers 830 to 832 may receive the reference values VREF2, VREF5, and VREF10 determined by the first to third gamma decoders 220 to 222 on the basis of the values stored in the gamma adjustment register 210, as inputs, respectively.

The first to third tap point buffers 830 to 832 may be connected to the tap point register 810, respectively. The tap point register 810 may store first and second selection signals (GTAP [2:0]) to be described later. The first to third tap point buffers 830 to 832 will be described in detail referring to FIG. 9.

Figure 9:
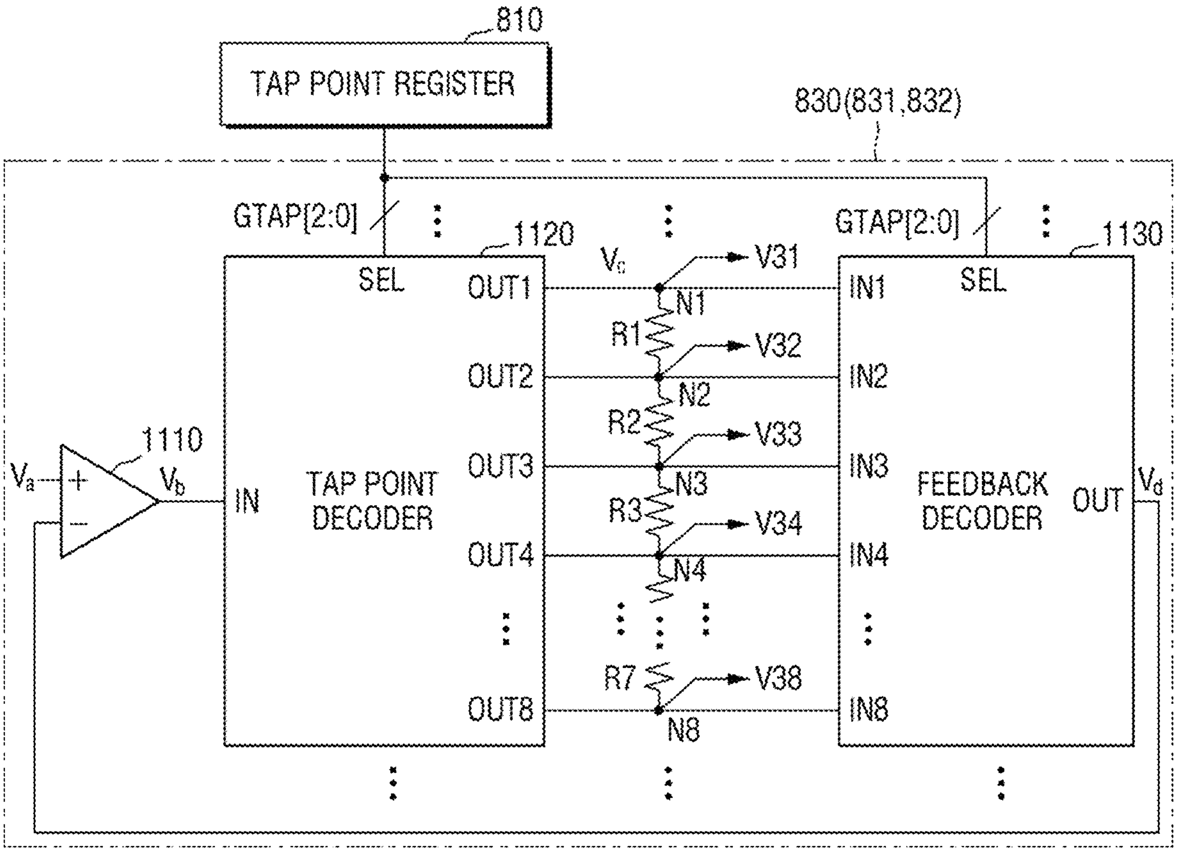
FIG. 9 is an example diagram for describing the structure of the tap point buffer according to some example embodiments.

FIG. 9 is an example diagram for describing the structure of the tap point buffer according to some example embodiments.

Referring to FIG. 9, the tap point buffers 830 to 832 according to some example embodiments may each include an amplifier 1110, a tap point decoder 1120, and a feedback decoder 1130.

In some example embodiments, a first signal Va may be provided to a positive input terminal (+) of the amplifier 1110. The amplifier 1110 may provide a third signal Vb to the tap point decoder 1120. The amplifier 1110 will be described referring to FIG. 10.

Figure 10:
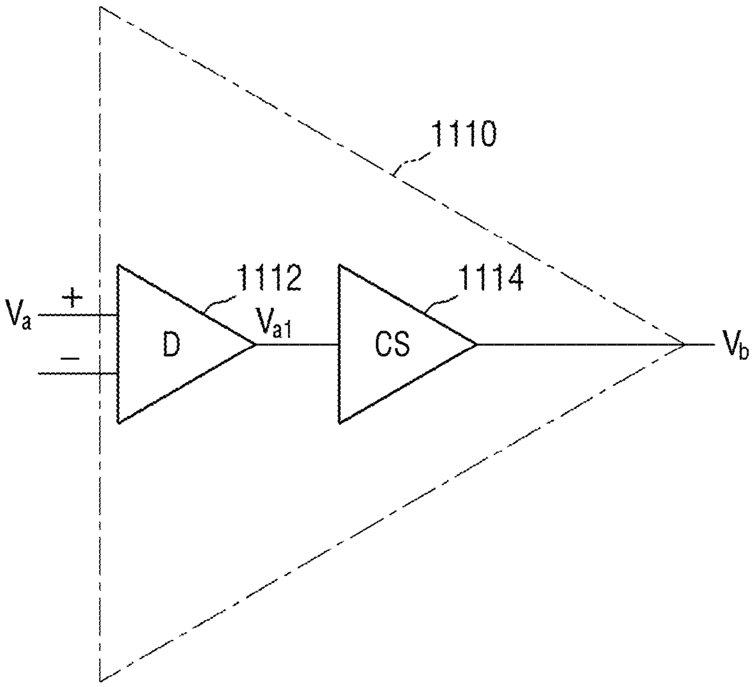
FIG. 10 is an example diagram for describing the amplifier according to some example embodiments.

FIG. 10 is an example diagram for describing the amplifier according to some example embodiments.

The amplifier 1110 according to some example embodiments may include a cascaded differential amplifier 1112, and a common source amplifier 1114. In other words, the first signal Va may be provided to the positive input terminal (+) of the differential amplifier 1112 included in the amplifier 1110. The differential amplifier 1112 may output a second signal Val to the common source amplifier 1114. The common source amplifier 1114 may receive the second signal Val and may output the third signal Vb. In other words, the first signal Va may become the second signal Val via the differential amplifier 1112, and the second signal Val may become a third signal Vb via the common source amplifier 1114. In other words, the third signal Vb may be the first signal Va having passed through the amplifier 1110.

In some example embodiments, the amplifier 1110 may be provided as a complementary metal-oxide semiconductor (CMOS). In some example embodiments, the amplifier 1110 may include only one differential amplifier 1112 and one common source amplifier 1114. Since one differential amplifier 1112 and one common source amplifier 1114 may be provided as the complementary metal-oxide semiconductor (CMOS), it is possible to improve integration of the gamma adjustment circuit 114_2 according to some example embodiments.

Referring again to FIG. 9, the third signal Vb may be provided to the tap point decoder 1120. The tap point decoder 1120 may include one input terminal IN, a plurality of output terminals OUT1 to OUT8, and a selection terminal SEL.

The plurality of output terminals OUT1 to OUT8 of the tap point decoder 1120 may be connected to the first to eighth nodes N1 to N8, respectively. The first node N1 and the second node N2 may be connected via a first resistor R1. Adjacent nodes such as the second node N2 and the third node N3, and the third node N3 and the fourth node N4 may be connected to each other via the second to seventh resistors R2 to R7. In some example embodiments, the first to seventh resistors R1 to R7 may have the same resistance value to each other. However, the example embodiments are not limited thereto. For example, the first to seventh resistors R1 to R7 may have resistance values different from each other. The voltages of the first to eighth nodes N1 to N8 may the thirty-first to thirty-eight output voltages V31 to V38, respectively, but this is for convenience of explanation, and the example embodiments are not limited thereto.

In some example embodiments, the first selection signal (GTAP [2:0]) may be provided to the tap point decoder 1120. For example, the first selection signal (GTAP [2:0]) may be provided to the selection terminal SEL of the tap point decoder 1120. The tap point decoder 1120 may connect any one of the input terminal IN of the tap point decoder 1120 and the plurality of output terminals OUT1 to OUT8 of the tap point decoder 1120, on the basis of the first selection signal (GTAP [2:0]). In other words, the third signal Vb provided to the input terminal IN of the tap point decoder 1120 may be provided to any one of the plurality of output terminals OUT1 to OUT8 on the basis of the first selection signal (GTAP [2:0]). That is, the third signal Vb provided to the input terminal IN of the tap point decoder 1120 may be provided to any one of the first to eighth nodes N1 to N8 as the fourth signal Vc.

In some example embodiments, the feedback decoder 1130 may include a plurality of input terminals IN1 to IN8, one output terminal OUT, and a selection terminal SEL. The first to eighth nodes N1 to N8 may be connected to a plurality of input terminals IN1 to IN8 of the feedback decoder 1130, respectively. In some example embodiments, the second selection signal (GTAP [2:0]) may be provided to the selection terminal SEL of the feedback decoder 1130. At this time, the first selection signal (GTAP [2:0]) and the second selection signal (GTAP [2:0]) may be the same.

The feedback decoder 1130 may connect any one of the plurality of input terminals IN1 to IN8 and the output terminal OUT of the feedback decoder 1130 on the basis of the second selection signal (GTAP [2:0]). That is to say, the feedback decoder 1130 may connect any one of the output terminal OUT of the feedback decoder 1130 and the first to eighth nodes N1 to N8 on the basis of the second selection signal (GTAP [2:0]).

In some example embodiments, the node connected to the input terminal IN of the tap point decoder 1120 by the first selection signal (GTAP [2:0]), and the node connected to the output terminal OUT of the feedback decoder 1130 by the second selection signal (GTAP [2:0]) may be identical to each other. For example, when the input terminal IN of the tap point decoder 1120 and the first node N1 are connected to each other by the first selection signal (GTAP [2:0]), the output terminal OUT of the feedback decoder 1130 and the first node N1 may be connected to each other by the second selection signal (GTAP [2:0]). In other words, the input terminal IN of the tap point decoder 1120 and the first output terminal OUT1 of the tap point decoder 1120 may be connected to each other by the first selection signal (GTAP [2:0]). The first output terminal OUT1 of the tap point decoder 1120 may be connected to the first node N1. The first node N1 may be connected to the first input terminal IN1 of the feedback decoder 1130. The first input terminal IN1 of the feedback decoder 1130 and the output terminal OUT of the feedback decoder 1130 may be connected to each other by the second selection signal (GTAP [2:0]). The output terminal OUT of the feedback decoder 1130 may be connected to a negative input terminal (−) of the amplifier 1110. That is to say, the output terminal OUT of the feedback decoder 1130 may be connected to the negative input terminal (−) of the differential amplifier 1112.

That is, in some example embodiments, when the first and second selection signals (GTAP [2:0]) are provided to the tap point decoder 1120 and the feedback decoder 1130, respectively, the input terminal IN of the tap point decoder 1120 to the output terminal OUT of the feedback decoder 1130 can be connected through any one of the first to eighth nodes N1 to N8.

In some example embodiments, when the first signal Va is provided to the amplifier 1110, the amplifier 1110 may output the third signal Vb to the tap point decoder 1120. The tap point decoder 1120 outputs the fourth signal Vc to any one of the first to eighth nodes N1 to N8 on the basis of the first selection signal (GTAP [2:0]). The feedback decoder 1130 may receive the fourth signal Vc as an input and may feed-back it to the negative input terminal (−) of the amplifier 1110 as the fifth signal Vd, on the basis of the second selection signal (GTAP [2:0]).

In some example embodiments, since the fourth signal Vc is fed back to the negative input terminal (−) of the amplifier 1110 as the fifth signal Vd, the magnitudes of the first signal Va, the fourth signal Vc and the fifth signal Vd may be substantially the same. Here, the expression in which the signal magnitudes are substantially the same means that the magnitudes of the signals are the same when it is assumed that there is no voltage drop occurring when passing through a conductor and an element. Those having ordinary skill in the technical field of the present inventive concepts may sufficiently understand expressions in which the magnitudes of the signals are substantially the same.

Although FIG. 9 illustrates that the tap point decoder 1120 and the feedback decoder 1130 are 3-bit decoders, respectively, but the example embodiments are not limited thereto.

Referring to FIGS. 8 and 9, in some example embodiments, the reference voltages to be provided to the tap point buffers 830 to 832 may be determined, using the gamma decoders 220 to 222. Also, the node which provides the reference voltage may be determined, using the tap point decoder 1120 included in the tap point buffers 830 to 832. In other words, the magnitude of the analog voltage may be determined using the gamma decoders 220 to 222, and the digital data included in the first digital data may be determined using the tap point decoder 1120. This will be described with reference to FIGS. 11 to 14.

FIGS. 11 to 14 are example graphs for illustrating determination of the magnitude of an analog voltage and the digital data corresponding thereto, using the gamma adjustment circuit according to some example embodiments.

Figure 11:
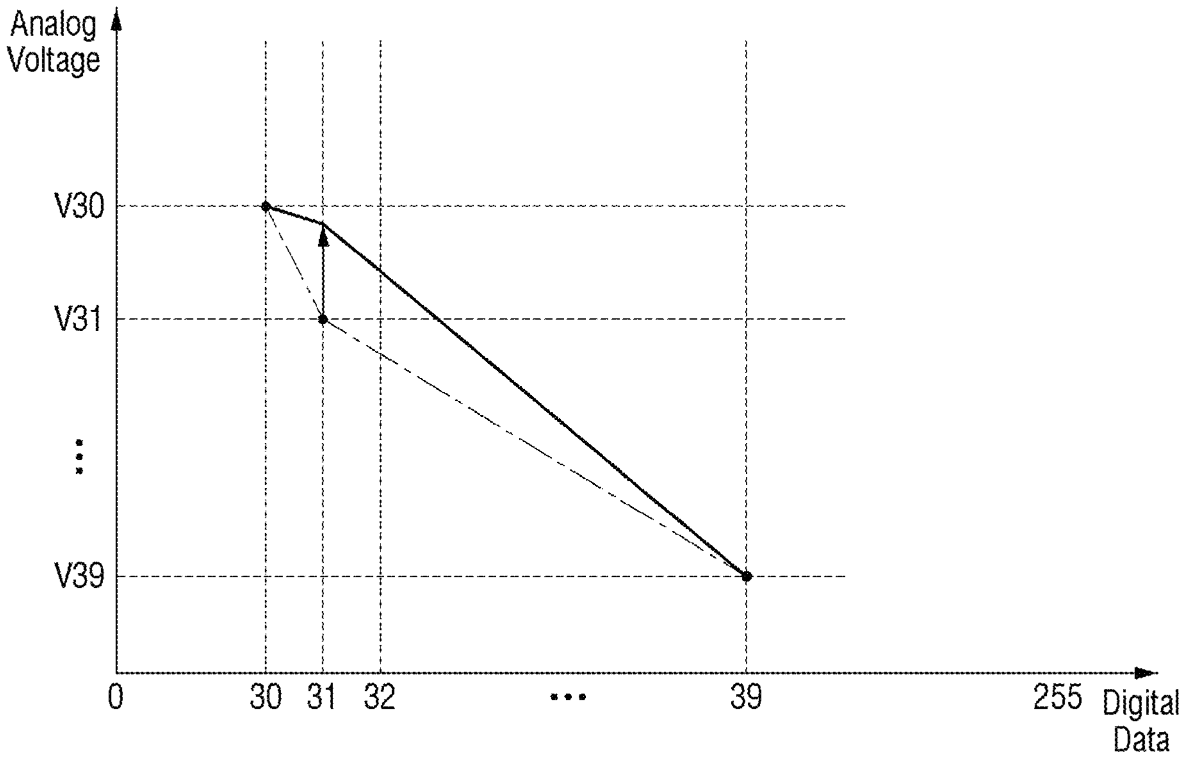
FIGS. 11 to 14 are example graphs for illustrating determination of the magnitude of an analog voltage and the digital data corresponding thereto, using the gamma adjustment circuit according to some example embodiments.

Referring to FIGS. 8, 9 and 11, it is assumed that a thirty output voltage V30 and a thirty-ninth output voltage V39 are fixed. In some example embodiments, the magnitude of the thirty-first output voltage V31 may be determined using the gamma decoders 220 to 222 of the gamma adjustment circuit 114_2. The thirty-first output voltage V31 means an analog voltage corresponding to the digital data 31. In some example embodiments, the magnitudes of the thirty-second through thirty-eighth output voltages V32 to V38 may depend on the magnitudes of the thirty-first output voltage V31 and the thirty-ninth output voltage V39. Therefore, if the magnitude of the thirty-first output voltage V31 changes, the magnitudes of the thirty-second to thirty-eighth output voltages V32 to V38 may also change.

Figure 12:
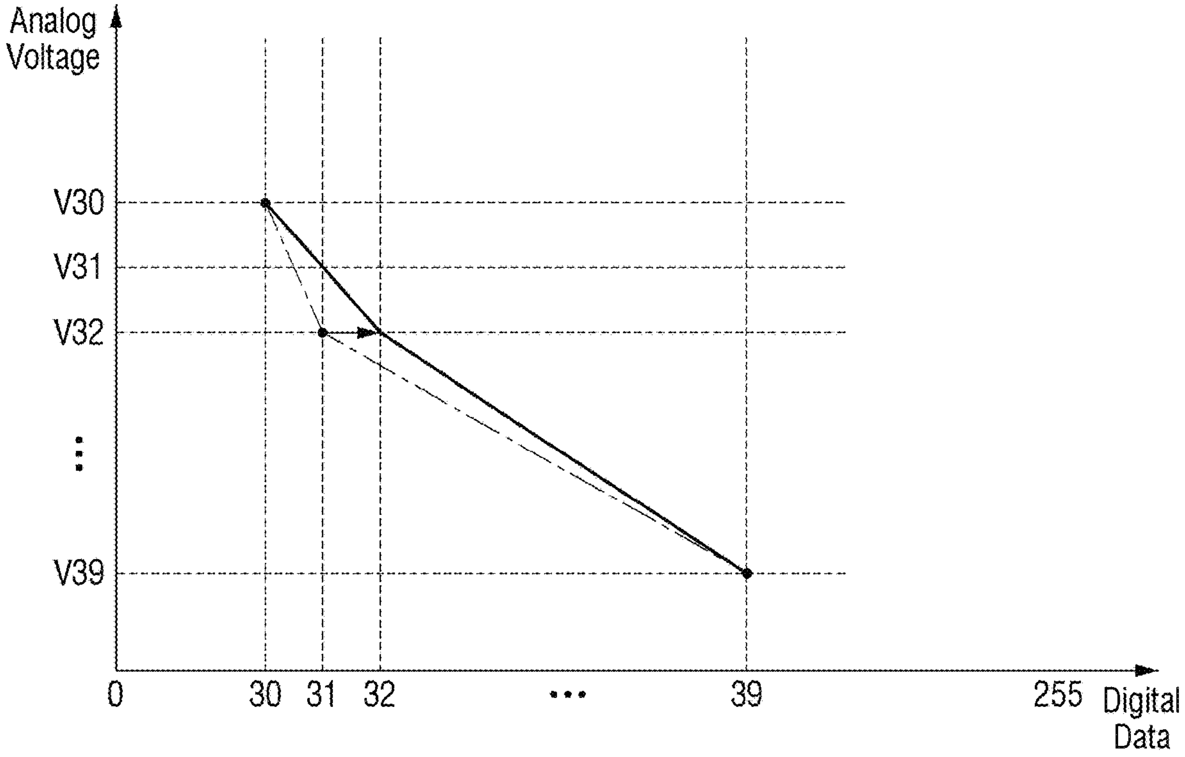

Referring to FIGS. 8, 9 and 12, it is assumed that the thirty output voltage V30 and the thirty-ninth output voltage V39 are fixed. In some example embodiments, the node to which the fourth signal Vc is applied may change from the first node N1 to the second node N2, using the tap point decoder 1120 of the gamma adjustment circuit 114_2. Therefore, the digital data 31 may change from the first digital data to the second digital data. Further, the digital data 32 may change from the second digital data to the first digital data. Since the digital data 31 changes to the second digital data, the thirty-first output voltage V31 corresponding to the digital data 31 may be determined depending on the thirty output voltage V30 and the thirty-second output voltage V32. The magnitudes of the thirty-third through thirty-eighth output voltages V33 to V38 may depend on the magnitudes of the thirty-second output voltage V32 and the thirty-ninth output voltage V39. Further, the magnitude of the thirty-second output voltage V32 may be determined using the gamma decoder.

Figure 13:
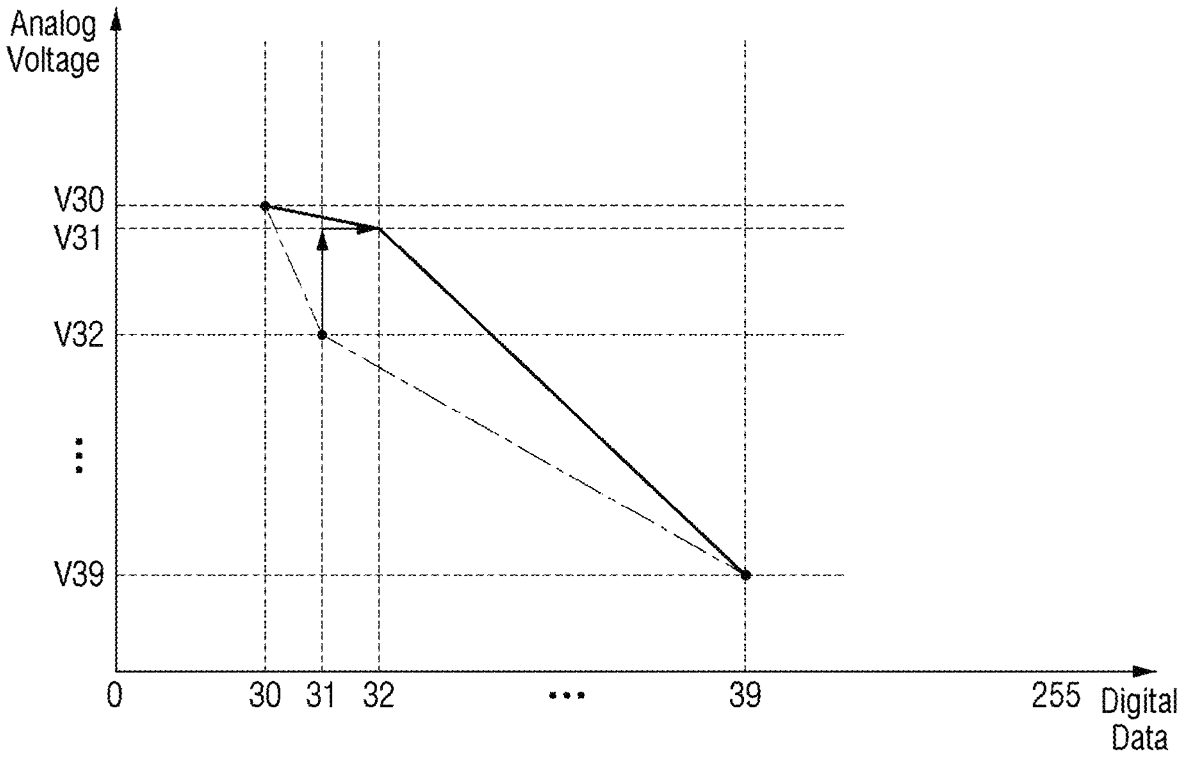

Referring to FIGS. 8, 9, and 13, it is assumed that the thirty output voltage V30 and the thirty-ninth output voltage V39 are fixed. In some example embodiments, the magnitude of the first signal Va may be adjusted, using the gamma decoders 220 to 222 of the gamma adjustment circuit 114_2. As described above, since the magnitude of the first signal Va is substantially the same as the magnitude of the fourth signal Vc, the magnitude of the fourth signal Vc may be adjusted, using the gamma decoders 220 to 222 of the gamma adjustment circuit 114_2. Also, the node to which the fourth signal Vc is provided may change from the first node N1 to the second node N2, using the tap point decoder 1120 of the gamma adjustment circuit 114_2. In other words, the magnitude of the analog voltage may be changed using the gamma decoders 220 to 222, and the digital data included in the first digital data may be determined using the tap point decoder 1120.

Figure 14:
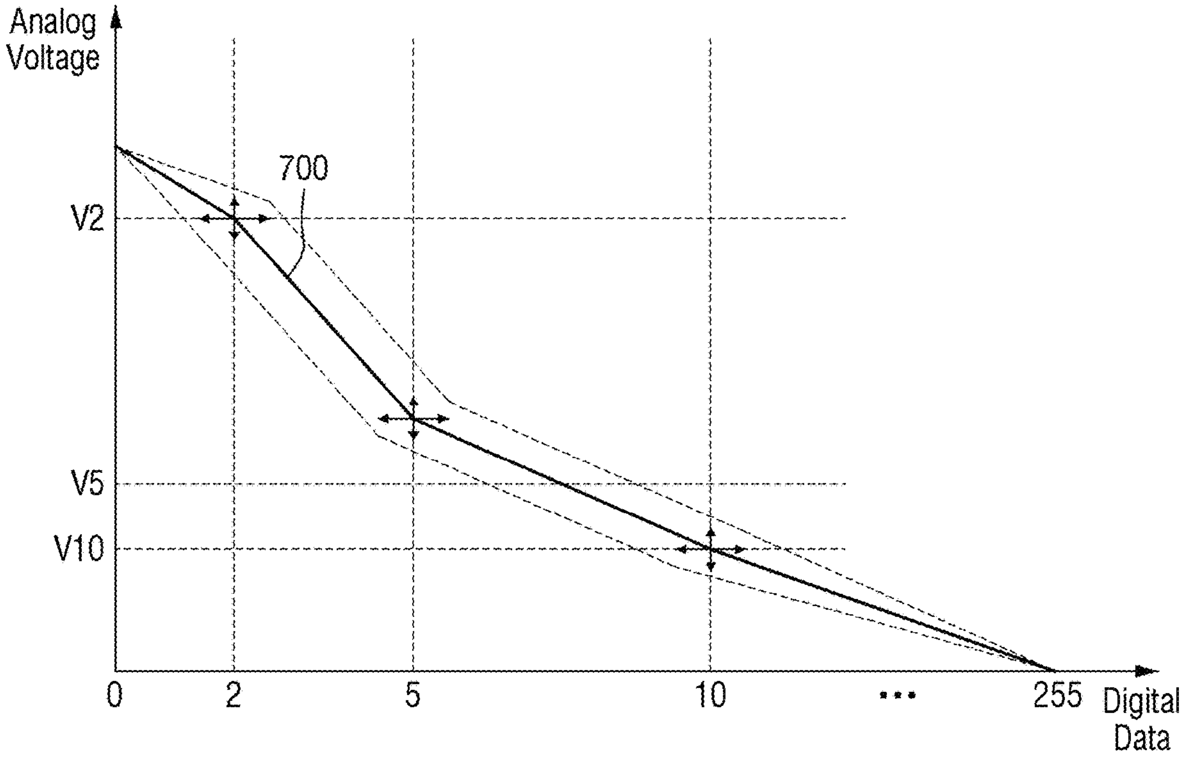

Consequently, referring to FIGS. 7 and 14, when using the gamma adjustment circuit 114_2 according to some example embodiments, the range in which the gamma curve 700 can be adjusted may increase as compared to the case of using the gamma adjustment circuit 114_1. In other words, according to some example embodiments, a gamma adjustment circuit 114_2 having a large adjustment range may be provided.

In some example embodiments, the amplifier 1110, the tap point decoder 1120 and the feedback decoder 1130 may be provided as a complementary metal-oxide semiconductor (CMOS). This will be described referring to FIG. 15.

Figure 15:
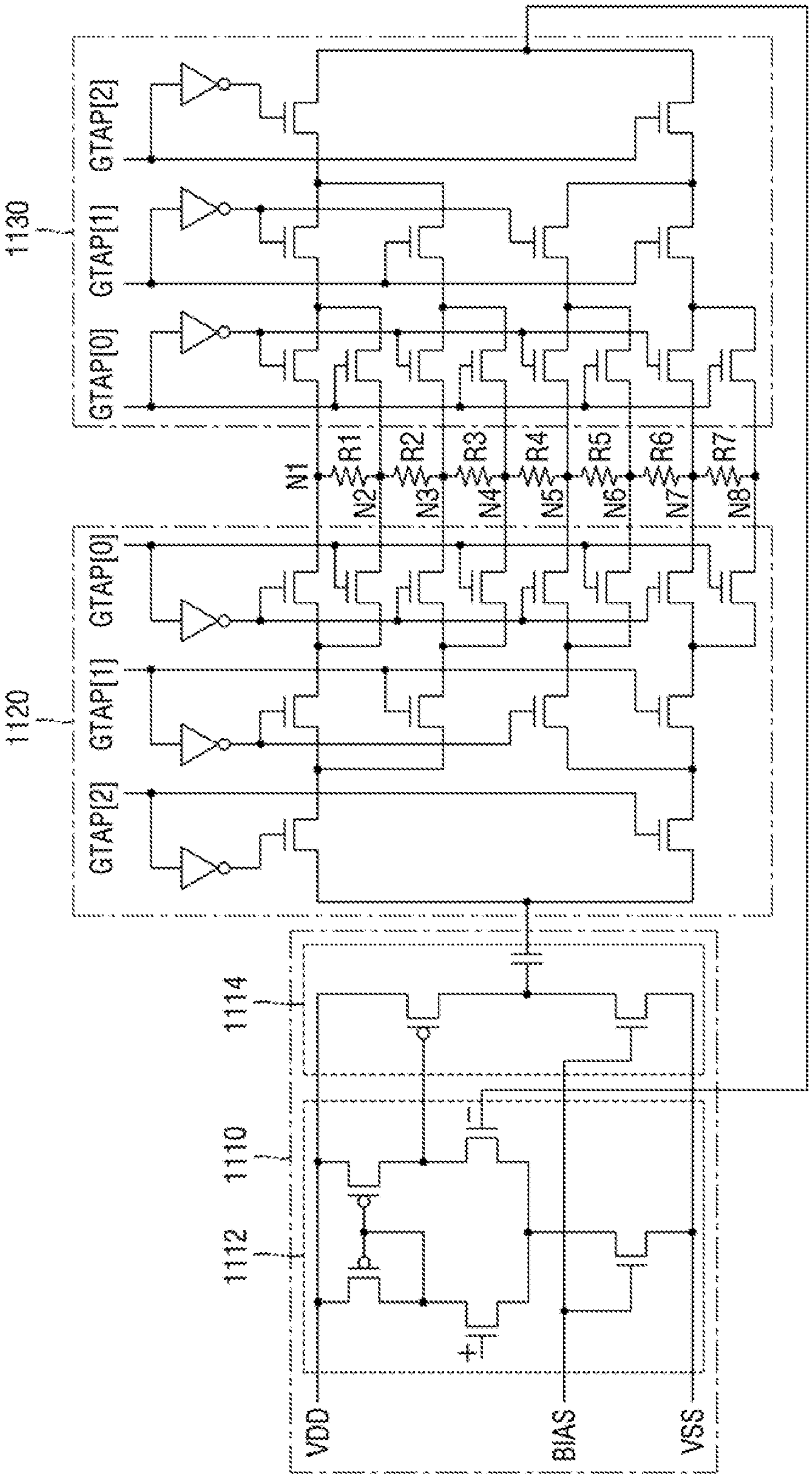
FIG. 15 is an example circuit diagram for describing the gamma adjustment circuit provided as a complementary metal-oxide semiconductor according to some example embodiments.

FIG. 15 is an example circuit diagram for describing the gamma adjustment circuit provided as a complementary metal-oxide semiconductor according to some example embodiments.

Referring to FIG. 15, an example in which the amplifier 1110, the tap point decoder 1120, and the feedback decoder 1130 are provided as the complementary metal-oxide semiconductor (CMOS) is illustrated. However, the example embodiments are not limited to these circuit diagrams. Those having ordinary skill in the technical field of the present inventive concepts may, of course, provide the amplifier 1110, the tap point decoder 1120, and the feedback decoder 1130 according to some example embodiments in various ways. For example, various circuits may be provided through a simple design change such as a simple change of the NMOS and PMOS of FIG. 15 or a change of the NMOS element to a transmission gate.

Referring to FIG. 15, the amplifier 1110 includes one differential amplifier 1112 and one common source amplifier 1114, and the output of the common source amplifier 1114 may be supplied to the tap point decoder 1120. The output of the feedback decoder 1130 may be provided to the negative input terminal (−) of the differential amplifier 1112. Since this is the same as or similar to the aforementioned explanation, the detailed description will not be provided.

In some example embodiments, since the amplifier 1110, the tap point decoder 1120, and the feedback decoder 1130 may be provided as the complementary metal-oxide semiconductor (CMOS), the degree of integration of the gamma adjustment circuit may be increased. That is, when using the gamma adjustment circuit 114_2 according to some example embodiments, it is possible to provide a gamma adjustment circuit having a relatively small size. Therefore, according to some example embodiments, it is possible to provide a display driver circuit with an increased degree of integration.

According to one or more example embodiments, the units and/or devices described above, such as the components of the display driver circuit (e.g., 100) including the gamma adjustment circuit (e.g., 114_2) as well as the sub-components thereof including the tap point buffer register and the tap point buffers as well as the amplifier, and decoders (e.g. the tap point decoder and the feedback decoder) included in each of the tap point buffers may be implemented using hardware, a combination of hardware and software, or a non-transitory storage medium storing software that is executable to perform the functions of the same.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more integrated circuits (ICs), one or more Application Specific Integrated Circuits (ASICs), one or more field programmable gate arrays (FPGAs), one or more System-on-Chips (SoCs), one or more programmable logic units (PLUs), one or more microprocessors, or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein.

The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

In concluding the detailed description, those skilled in the art will appreciate that many variations and modifications may be made to the example embodiments without substantially departing from the principles of example embodiments of the present inventive concepts. Therefore, the disclosed example embodiments of the inventive concepts are used in a generic and descriptive sense only and not for purposes of limitation.

What is claimed is:

1. A gamma adjustment circuit configured to provide an analog voltage to a source driver, the gamma adjustment circuit comprising:

a first decoder configured to receive a first voltage signal and a second voltage signal different from the first voltage signal, and output one of the first voltage signal and the second voltage signal as a third voltage signal based on a value from a first register;

an amplifier including a positive input and a negative input, the positive input configured to receive the third voltage signal, and to output a fourth voltage signal;

a second decoder configured to receive the fourth voltage signal, output a fifth voltage signal to one of a first node and a second node different from the first node by connecting an input node of the second decoder to one of the first node or the second node based on a value from a second register and provide the fifth voltage signal to the source driver as the analog voltage;

a third decoder connected to the first node and the second node, the third decoder configured to receive the fifth voltage signal and output a sixth voltage signal to the negative input of the amplifier; and a first resistor connected between the first node and the second node such that the fifth voltage signal provided from the second decoder to the third decoder varies based on whether the voltage is provided from the first node or the second node.

2. The gamma adjustment circuit of claim 1, wherein the amplifier comprises:

a cascaded differential amplifier connected to the positive input and the negative input such that the cascaded differential amplifier is configured to receive the third voltage signal from the first decoder via the positive input of the amplifier and the sixth voltage signal from the third decoder via the negative input of the amplifier; and a common source (CS) amplifier configured to output the fourth voltage signal to the second decoder.

3. The gamma adjustment circuit of claim 1, further comprising:

the first register connected to the first decoder such that the first decoder is configured to select one of the first and second voltage signals based on the value of the first register; and the second register connected to the second decoder such that the second decoder is configured to select one of the first node and the second node based on the value from the second register.

4. The gamma adjustment circuit of claim 3, wherein the second register is connected to the third decoder such that, based on the value from the second register, the third decoder is configured to select a same one of the first node and the second node as the second decoder.

5. The gamma adjustment circuit of claim 1, further comprising:

a second resistor connected between the second node and a third node, the second resistor having a same resistance as the first resistor, wherein the second decoder is configured to output the fifth voltage signal to one of the first node, the second node and the third node, and the third decoder is configured to receive the fifth voltage signal from one of the first node, the second node and the third node, and to provide the sixth voltage signal to the negative input of the amplifier.

6. The gamma adjustment circuit of claim 1, wherein magnitudes of voltage levels of the third voltage signal and the sixth voltage signal are substantially equal.

7. The gamma adjustment circuit of claim 2, wherein the first decoder, the second decoder, the third decoder and the amplifier are complementary metal-oxide semiconductors (CMOS) such that the amplifier includes a CMOS configured as the cascade differential amplifier and the CS amplifier.

8. The gamma adjustment circuit of claim 1, wherein the first decoder is configured to determine a magnitude of an input analog voltage, and the second decoder is configured to determine which of the first node and the second node receive the input analog voltage.

9. A display driver circuit comprising:

a source driver integrated circuit (IC) configured to transmit an analog voltage to a display panel;

a gate driver integrated circuit (IC) configured to control a gate of the display panel so that the analog voltage is provided to a storage device associated with the display panel;

a controller configured to control the source driver IC and the gate driver IC based on a signal received from a host; and a gamma adjustment circuit configured to transmit the analog voltage to the source driver IC, the gamma adjustment circuit including, an amplifier including a cascade differential amplifier and a common source (CS) amplifier, the cascade differential amplifier configured to receive a first signal, and to generate a second signal based on the first signal, the CS amplifier configured to receive the second signal, and to generate a third signal based on the second signal, a first decoder including a first output terminal and a second output terminal different from the first output terminal, the first decoder configured to receive the third signal from the CS amplifier, the first decoder configured to select, based on a first selection signal, one of the first output terminal and the second output terminal as a selected output terminal, to provide a fourth signal to the selected output terminal such that the first decoder outputs the fourth signal to the first output terminal in response to the first selection signal being a first value and outputs the fourth signal to the second output terminal in response to the first selection signal being a second value, the first decoder configured to provide the fourth signal to the source driver IC as the analog voltage and a second decoder including a first input terminal and a second input terminal connected to the first output terminal and the second output terminal of the first decoder, respectively.

10. The display driver circuit of claim 9, wherein the second decoder is configured to receive the fourth signal and feedback a fifth signal to the cascade differential amplifier.

11. The display driver circuit of claim 10, wherein the second decoder is configured to select, based on a second selection signal, one of the first input terminal and the second input terminal as a selected input terminal such that the selected input terminal of the second decoder is connected to the selected output terminal of the first decoder.

12. The display driver circuit of claim 9, wherein the signal received from the host includes digital data, the controller is configured to provide the digital data to the source driver IC, and the source driver IC is configured to convert the digital data into the analog voltage, using the fourth signal.

13. The display driver circuit of claim 9, wherein the gamma adjustment circuit further includes a third decoder configured to determine a magnitude of the first signal.

14. The display driver circuit of claim 13, wherein the first decoder, the second decoder, the third decoder and the amplifier are complementary metal-oxide semiconductors (CMOS) such that the amplifier includes a CMOS configured as the cascade differential amplifier and the CS amplifier.

15. A display driver circuit comprising:

a source driver integrated circuit (IC) configured to transmit an analog voltage to a display panel;

a gate driver integrated circuit (IC) configured to control a gate of the display panel so that the analog voltage is provided to a storage device associated with the display panel;

a controller configured to control the source driver IC and the gate driver IC based on a signal received from a host; and a gamma adjustment circuit configured to transmit the analog voltage to the source driver IC, the gamma adjustment circuit including, a first decoder including an input terminal, a first output terminal and a second output terminal, the first decoder configured to connect the input terminal to one of the first output terminal and the second output terminal based on a value from a second register, the first output terminal connected to a first node and the second output terminal connected to a second node, the first node and the second node having a first resistor connected therebetween, the first decoder configured to provide the analog voltage to the source driver IC, a second decoder including a first input terminal, a second input terminal and an output terminal, the first input terminal and the second input terminal of the second decoder connected to the first output terminal and the second output terminal of the first decoder, respectively, and an amplifier including a negative input terminal, a positive input terminal and an output terminal, the negative input terminal of the amplifier being connected to the output terminal of the second decoder, and the output terminal of the amplifier being connected to the input terminal of the first decoder.

16. The display driver circuit of claim 15, wherein the signal received from the host includes digital data, the controller is configured to provide the digital data to the source driver IC, and the source driver IC is configured to convert the digital data into the analog voltage, using the gamma adjustment circuit, and to transmit the analog voltage to the display panel.

17. The display driver circuit of claim 15, wherein the gamma adjustment circuit further comprises:

a third decoder connected to the positive input terminal of the amplifier, the third decoder configured to determine a first voltage to provide to the positive input terminal of the amplifier.

18. The display driver circuit of claim 17, wherein the gamma adjustment circuit further comprises:

a first register connected to the third decoder such that the third decoder is configured to determine the first voltage based on a value of the first register; and the second register connected to the first decoder such that the first decoder is configured to select, based on the value of the second register, one of the first node and the second node as a selected node, and provide an output of the amplifier to the selected node as a second voltage.

19. The display driver circuit of claim 18, wherein the second register is connected to the second decoder such that, based on the value of the second register, the first decoder and the second decoder are configured to select a same one of the first node and the second node as the selected node.

20. The display driver circuit of claim 17, wherein the first decoder, the second decoder, the third decoder and the amplifier are complementary metal-oxide semiconductors (CMOS) such that the amplifier includes a CMOS configured as a cascade differential amplifier and a common source (CS) amplifier.

* * * * *